US012509292B2

(12) United States Patent
Dinh et al.

(10) Patent No.: US 12,509,292 B2
(45) Date of Patent: Dec. 30, 2025

(54) DEVICE FOR PACKAGING A LUBRICANT FOR TIMEPIECES

(71) Applicant: The Swatch Group Research and Development Ltd, Marin (CH)

(72) Inventors: Jean-Bosco Thanh Khai Dinh, Fribourg (CH); Yoann Mosteiro Vazquez, Montmagny (CH); Romain Despland, Fribourg (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 18/630,013

(22) Filed: Apr. 9, 2024

(65) Prior Publication Data

US 2024/0375848 A1 Nov. 14, 2024

(30) Foreign Application Priority Data

May 9, 2023 (EP) .................................... 23172343

(51) Int. Cl.

*B65D 83/763* (2025.01)
*B65B 3/04* (2006.01)
*B65B 7/28* (2006.01)
*B65D 85/00* (2006.01)
*G04D 5/00* (2006.01)

(52) U.S. Cl.

CPC .............. *B65D 83/763* (2025.01); *B65B 3/04* (2013.01); *B65B 7/2821* (2013.01); *B65D 85/70* (2013.01); *G04D 5/00* (2013.01)

(58) Field of Classification Search

CPC .......... B65B 3/04; B65D 83/76; B65D 83/763
See application file for complete search history.

(56) References Cited

U.S. PATENT DOCUMENTS 1,863,785 A * 6/1932 Dickinson ............. A61M 5/315 604/207
2,643,801 A * 6/1953 Kollmeyer ............. G04D 5/005 222/149
4,655,609 A * 4/1987 Alber ....................... G01K 1/18 65/68

(Continued)

FOREIGN PATENT DOCUMENTS

CH 239 788 A 11/1945
CH 440 149 A 3/1967
CN 201597909 U 10/2010

(Continued)

OTHER PUBLICATIONS

Japanese of Reasons for Refusal issued Apr. 1, 2025 in Japanese Patent Application No. 2024-023584 with English Machine translation, 9 pgs.

(Continued)

*Primary Examiner* — Bryon P Gehman
(74) *Attorney, Agent, or Firm* — Oblon, McClelland, Maier & Neustadt, L.L.P.

(57) ABSTRACT

A device for packaging a lubricant, the device including a hollow capillary tube intended to contain the lubricant, the tube including, on the one hand, a first opening closed by a piston arranged to cooperate with a rod movable longitudinally in the capillary tube, and on the other hand, a second free opening through which the lubricant flows when pressure is exerted on the piston with the movable rod.

9 Claims, 1 Drawing Sheet

(56) References Cited

U.S. PATENT DOCUMENTS

| | | | | |
|---|---|---|---|---|
| 11,624,115 | B2 * | 4/2023 | Felts | C23C 16/50 604/230 |
| 2017/0003656 | A1 | 1/2017 | Martin et al. | |

FOREIGN PATENT DOCUMENTS

| | | | |
|---|---|---|---|
| EP | 2 947 524 | A1 | 11/2015 |
| JP | 55-45578 | U | 3/1980 |
| JP | 58-203871 | A | 11/1983 |
| JP | 10-221334 | A | 8/1998 |

OTHER PUBLICATIONS

European Search Report issued Oct. 2, 2023 in European Application 23172343.8 filed on May 9, 2023, 3 pages (with English Translation of Categories of Cited Documents).

Japanese Office Action issued in Japanese Patent Application No. 2024-023584 on Aug. 26. 2025, (with English Translation).

* cited by examiner

DEVICE FOR PACKAGING A LUBRICANT FOR TIMEPIECES

CROSS-REFERENCE TO RELATED APPLICATION

This application claims priority to European Patent Application No. 23172343.8 filed on May 9, 2023, the entire disclosure of which is hereby incorporated herein by reference.

TECHNICAL FIELD OF THE INVENTION

The invention relates to a device for packaging a lubricant for timepieces.

The invention relates to the field of tools for fine mechanics, and in particular tools for watchmakers, and more specifically for the lubrication of watches or timepieces.

TECHNOLOGICAL BACKGROUND

The lubrication of a timepiece is an essential operation, for which there are few tools, apart from the automatic oiler and the oil container, and means for packaging the different oils used. However, some tools, such as packaging means, are not adapted to the needs of watchmakers, in particular in terms of the amount of packaging bottles and the amount used by watchmakers.

The packaging methods used in the prior art generally involve a volume of lubricant that is too large for the operator, with the lubricant remaining in the bottle for prolonged periods. This results in sub-optimal storage and degradation of the properties of the lubricant over time once the bottle has been opened, and implicitly a loss when the lubricant remaining in the bottle is no longer usable and has to be discarded. In addition, to take small amounts from the bottle, the watchmaker may use a screwdriver, which can lead to contamination of the lubricant in the bottle and increase the rate of lubricant degradation.

SUMMARY OF THE INVENTION

The purpose of the invention is in particular to overcome the various disadvantages of the prior art.

More specifically, a purpose of the invention is to provide a device for packaging a lubricant for the interventions of the watchmaker, for which there is no good compact solution that allows clean oil to be carried safely, which is easily identifiable without risk of confusion, while minimising the degradation of the lubricant over time.

The invention also provides watchmakers with a device for packaging a very small-volume lubricant.

To this end, the invention relates to a device for packaging a lubricant, the device comprising a hollow capillary tube intended to contain a lubricant, the tube comprising, on the one hand, a first opening closed by a piston arranged to cooperate with a rod movable longitudinally in the capillary tube, and on the other hand, a second free opening through which the lubricant flows when pressure is exerted on the piston by means of the movable rod.

In accordance with other advantageous variants of the invention:

the capillary tube is made of glass;

the piston is made from a wax;

the movable rod is made of plastic material;

the capillary tube has a length comprised between 20 mm and 150 mm;

the capillary tube has an internal diameter comprised between 0.6 mm and 2 mm;

the capillary tube comprises a coloured locator;

the length of the capillary is greater than the sum of the length of the rod and the length of the piston.

The invention also relates to a lubrication kit comprising a device for packaging a lubricant according to the invention, and plugs disposed at each of the openings of the capillary tube to keep the capillary tube sealed during transport.

The invention also relates to a method for filling a capillary tube of a device for packaging a lubricant according to the invention, comprising the following steps:

providing a capillary tube with first and second openings;

forming a coloured locator close to the first opening;

depositing between 0.02 ml and 0.1 ml of lubricant in the capillary tube through the first opening;

inserting a piston into the first opening of the capillary tube;

optionally, placing a plug over the first and second openings of the capillary tube.

BRIEF DESCRIPTION OF THE FIGURES

Other features and advantages of the invention will become apparent from the following detailed description, which is given as a non-limiting example, with reference to the attached drawings wherein.

DETAILED DESCRIPTION OF THE INVENTION

Figure 1:
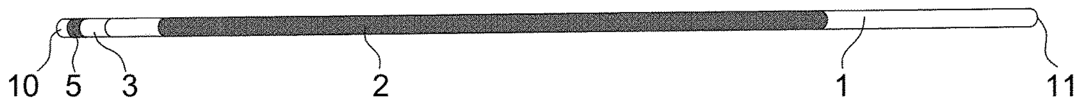
FIG. 1 shows a top view of a capillary tube of a packaging device according to the invention.
Figure 2:
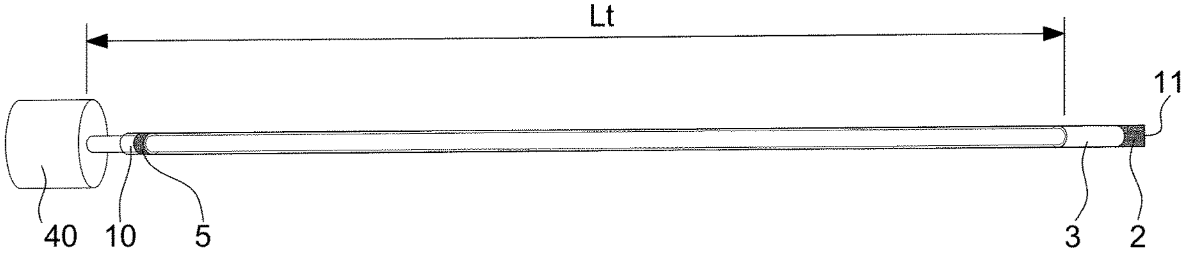
FIG. 2 shows a top view of a packaging device used according to the invention.
Figure 3:
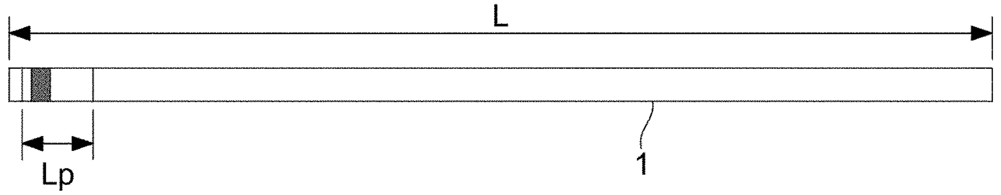
FIG. 3 shows a cross-sectional view of a capillary tube of a packaging device according to the invention.
Figure 4:
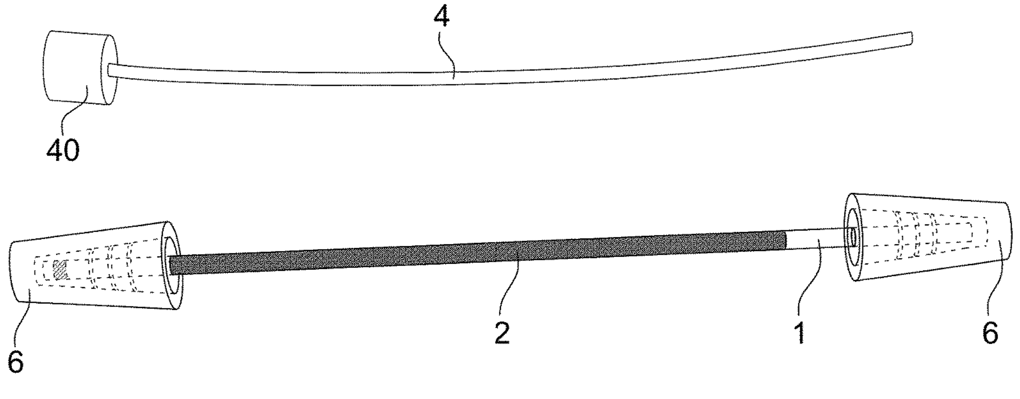
FIG. 4 shows a view of a packaging kit for a device according to the invention.

FIG. 1 shows a schematic top view of a packaging device according to the invention.

As shown in FIG. 1, the device for packaging a lubricant 2 comprises a hollow capillary tube 1 intended to contain a lubricant 2. The tube 1, on the one hand, comprises a first opening 10 closed by a piston 3, and on the other hand, a second free opening 11 through which the lubricant 2 flows. The piston 3 is arranged to cooperate with a rod 4 which is movable longitudinally in the capillary tube 1 to allow the lubricant 2 to be discharged through the second free opening 11 when pressure is exerted on the piston 3 by means of the rod 4.

The lubricant 2 contained in the packaging device can be either an oil or a grease.

The capillary tube 1 receiving the lubricant 2 is made of glass. This material provides a packaging device that is inert to the lubricant 2 contained in the tube 1.

The piston 3 is made from a synthetic or natural wax or a polymer material. The piston 3 must occupy the volume of the tube wherein it is placed so as to prevent the lubricant 2 from passing behind the piston 3 when pressure is exerted thereon. In addition, such a piston ensures that the tube is only opened and used once.

According to the invention, the rod 4 is made from a plastic material. The latter must be sufficiently rigid to be able to exert sufficient pressure on the piston 3. To make the rod 4 easier to handle, it has a head 40 that is wider than the rod 4. Unlike the capillary tube 1, the rod 4 can be subsequently reused with other tubes.

The length of the capillary tube 1 is comprised between 20 mm and 150 mm, and the internal diameter of the tube comprised between 0.6 mm and 2 mm. Such dimensions allow to accommodate between 0.02 ml and 0.1 ml of lubricant in the capillary tube 1, a much smaller amount than the bottles normally used, which contain 2 ml. It is therefore easy to understand that the very small volume present in the tube 1 allows all the present lubricant to be used in a relatively short period of time, without the lubricant losing any of its qualities/properties.

According to the invention, the capillary tube comprises a coloured locator 5 near the first opening 10. The locator 5 allows the operator to quickly identify where the piston 3 is located and thus place the tube 1 directly in the correct direction.

The lubricant 2 can also be coloured to help the operator identify the correct lubricant to use. Indeed, many lubricating oils or greases are used by watchmakers or operators during the assembly and maintenance of timepieces, with each oil having particular properties depending on where it is deposited in the timepiece. It is therefore useful for the watchmaker or operator to be able to identify the category of lubricant to be used quickly using a colour code. Thus, the lubricant can be coloured green, blue, purple or red to quickly and visually identify the category of lubricant to be used.

According to a particularly advantageous aspect of the invention, the length L of the capillary tube 1 is greater than the sum of the length Lt of the rod 4 and the length Lp of the piston 3. Such an arrangement ensures that the lubricant 2 is extracted over almost the entire length of the capillary tube 1, leaving a tiny portion of the lubricant 2 on the last millimetre of the tube 1 to avoid using lubricant potentially contaminated by the wax piston.

Thanks to these features, it is possible to obtain a packaging device with a very small volume for a lubricant 2, with a space-saving construction and enabling the oil to be used in a relatively short period of time to prevent it from degrading over time.

The invention also relates to a packaging kit comprising a packaging device according to the invention, as well as plugs 6 disposed at each of the openings of the capillary tube 1 to keep the capillary tube sealed during transport.

As a result, the device can be marketed in packs of ten or more devices. Separating the lubricant into such small amounts makes it easier to deposit the lubricant in the oil container, to avoid contamination (for example using a screwdriver to take lubricant from a bottle), and to keep the lubricant fresh (avoiding to keep a bottle that has already been opened for several years).

With such a device, the watchmaker extracts all the lubricant in an oil container each time a capillary tube is opened and uses this amount with an oil pick in the course of the week. The watchmaker can then use a new capillary each week and work with a lubricant that has preserved all its qualities.

The invention also relates to a method for filling a capillary tube 1 of a packaging device according to the invention, comprising the following steps:

- providing a capillary tube 1 with a first opening 10 and a second opening 11;
- forming a coloured locator 5 close to the first opening 10;
- depositing between 0.02 ml and 0.1 ml in the capillary tube 1 through the first opening;
- inserting a piston 3 through the first opening 10 of the capillary tube 1;
- optionally, placing a plug 6 in the first and second openings 10, 11.

The invention claimed is:

1. A device for packaging a lubricant, comprising:

a hollow capillary tube configured to contain the lubricant, wherein the tube includes a first opening closed by a piston arranged to cooperate with a rod movable longitudinally in the capillary tube, and wherein the tube further includes a second free opening through which the lubricant flows when pressure is exerted on the piston with the rod wherein a length (L) of the capillary tube is greater than a sum of a length (It) of the rod and a length (lp) of the piston.

2. The packaging device according to claim 1, wherein the capillary tube is made of glass.

3. The packaging device according to claim 1, wherein the piston is made from a wax or a polymer material.

4. The packaging device according to claim 1, wherein the movable rod is made of plastic material.

5. The packaging device according to claim 1, wherein the length of the capillary tube is between 20 mm and 150 mm.

6. The packaging device according to claim 1, wherein the capillary tube has an internal diameter comprised between 0.6 mm and 2 mm.

7. The packaging device according to claim 1, wherein the capillary tube comprises a coloured locator.

8. A packaging kit comprising a packaging device according to claim 1, and plugs disposed at each of the openings of the capillary tube to keep the capillary tube sealed during transport.

9. A method for filling a capillary tube of a packaging device according to claim 1, comprising the following steps:

- providing a capillary tube with a first opening and a second opening;
- forming a coloured locator close to the first opening;
- depositing between 0.02 ml and 0.1 ml of lubricant in the capillary tube through the first opening;
- inserting a piston through the first opening of the capillary tube; and
- placing a plug over the first and second openings of the capillary tube.

* * * * *